United States Patent [19]
Reichert et al.

[11] Patent Number: 5,720,022
[45] Date of Patent: Feb. 17, 1998

[54] METHOD OF CONVERTING A DIMENSIONAL REPRESENTATION OF A TECHNICAL DRAWING IN A CAD SYSTEM FROM A FIRST DIMENSIONAL REPRESENTATION STANDARD INTO A SECOND DIMENSIONAL REPRESENTATION STANDARD

[75] Inventors: Mark Reichert, Ithaca, N.Y.; Michael Kaercher, Stuttgart, Germany

[73] Assignee: Hewlett-Packard Company, Palo Alto, Calif.

[21] Appl. No.: 607,843

[22] Filed: Feb. 27, 1996

[30]       Foreign Application Priority Data

Mar. 29, 1995 [EP] European Pat. Off. ............ 95104672

[51] Int. Cl.$^6$ .................................................. G06F 15/00
[52] U.S. Cl. .................................................... 395/139
[58] Field of Search ............................ 395/139, 140, 395/133; 345/127, 131

[56]             References Cited

U.S. PATENT DOCUMENTS 5,581,796  12/1996  Koga et al. ........................ 395/133

FOREIGN PATENT DOCUMENTS

484928A2  6/1991  European Pat. Off. .

OTHER PUBLICATIONS

Computer Aided Design, vol. 23, No. 4, 1 May 1991 (pp. 282–296) Shah, J. J. et al., "Experimental Investigation of the Step Form–Feature Information Model".

*Primary Examiner*—Phu K. Nguyen

[57]             ABSTRACT

In a method and a CAD system for converting a dimensional representation of a technical drawing from a first dimensional representation standard with first dimensional representation attributes into a second dimensional representation standard with second dimensional representation attributes the dimensional representations of a technical drawing which are to be converted are selected and read into a list, and starting with the first dimensional representation element in the list, a dimensional representation element is read from the list, and it is determined whether the dimensional representation element is provided with dimensional representation element legends which are independent of dimensional representation standards, and, if this is the case, all dimensional representation element legends are stored, the first dimensional representation attributes of the dimensional representation element are converted into the second dimensional representation attributes, and it is determined whether the dimensional representation element is provided with dimensional representation legends which are independent of dimensional representation standards, and, if this is the case, the dimensional representation element legends are restored and inserted into the dimensional representation element having the second dimensional representation attributes, and it is determined whether the dimensional representation element is provided with tolerance data, and, if this is the case, the tolerance data is converted into tolerance data having the second dimensional representation attributes.

7 Claims, 4 Drawing Sheets

1

METHOD OF CONVERTING A DIMENSIONAL REPRESENTATION OF A TECHNICAL DRAWING IN A CAD SYSTEM FROM A FIRST DIMENSIONAL REPRESENTATION STANDARD INTO A SECOND DIMENSIONAL REPRESENTATION STANDARD

FIELD OF THE INVENTION

The present invention refers to a method of converting a dimensional representation of a technical drawing in a CAD system from a first dimensional representation standard with first dimensional representation attributes into a second dimensional representation standard with second dimensional representation attributes. Furthermore, the present invention refers to a CAD system which is adapted to convert a dimensional representation of a technical drawing from a first dimensional representation standard with first dimensional representation attributes into a second dimensional representation standard with second dimensional representation attributes.

BACKGROUND OF THE ART

When technical drawings are produced by means of a CAD system, so-called dimensional representations are used for representing the dimensions of the technical drawing. These dimensions serve to permit an accurate production of a component in accordance with the technical drawing.

As far as the dimensional representation is concerned, different dimensional representation standards are in force in different countries. In Germany, for example, the DIN standard (DIN=Deutsche Industrie-Norm) exists. Additional known standards include the JIS standard (JIS=Japanese Industrial Standard), the ANSI standard (ANSI=American National Standards Institute) and the ISO standard (ISO= International Organization for Standardization). In connection with company-internal cases of use of the technical drawing, a company-internal standard may also be used instead of the standards described hereinbefore.

The above-described standards are defined by a plurality of dimensional representation attributes which fulfil the requirements of the respective standard. Such attributes may, for example, include the following ones:

line style (arrow types, linewidth, etc.)

text location, font, etc.

pre/post-fix style es, tolerance style.

Reference is made to the fact that this list is not a conclusive enumeration of the various attributes.

As long as the technical drawings produced in a accordance with a specific standard are only used within the sphere where this standard is in force (i.e. within Germany as far as the DIN standard is concerned, or only within the firm in question as far as a company-internal standard is concerned), a conversion of the standard will not be necessary.

If, however, the technical drawings are to be used in other spheres as well, e.g. in cases in which the technical drawing was produced within a specific firm in accordance with a company-internal standard and is then given, for the purpose of production, to an external enterprise to which this standard is unknown, the dimensional representation of the technical drawing will have to be converted into the standard which is in force for this enterprise. This is the only possibility of guaranteeing correct production of a component on the basis of the technical drawing.

2

FIG. 4 discloses a technical drawing 400 which shows a representation of a component 402 as well as of the dimensional representation 404 thereof.

The precise form of the representation of the component 402 is of secondary importance; it only serves to permit the dimensional representation 404.

The dimensional representation 404 is composed of a plurality of dimensional representation elements 406a to 406k.

In the technical drawing 400 shown in FIG. 4, a company-internal standard has been used, by way of example, for the dimensional representation 404.

In the following, the various dimensional representation attributes used in the technical drawing will be described in detail on the basis of the dimensional representation element 406a.

Said dimensional representation element 406a comprises arrows 408a, a line 408b and a legend 408c with tolerance data. Furthermore, the dimensional representation element 406a includes dimensioning lines 408d. In connection with the standard used for this technical drawing, the legend 408c is arranged centrally between the dimensioning lines 408d in such a way that it is located between the lines 408d and the arrows 408a.

If this technical drawing 400 is to be used e.g. for an external production of the component shown, it will be necessary to convert the dimensional representation, which has been produced in accordance with a company-internal standard, into a standard which is known outside the firm, The conversion of the dimensional representation 404 is carried out by converting each individual dimensional representation element 406a–406k. For this conversion, it will be necessary to convert the various dimensional representation attributes, e.g. 408a–408d, for each dimensional representation element individually.

This type of conversion necessitates a substantial expenditure of time until the whole dimensional representation 404 has been converted into the new standard.

SUMMARY OF THE INVENTION

Taking as a basis this prior art, it is the object of the present invention to provide a method which is used for converting a dimensional representation of a technical drawing and which permits the dimensional representation to be converted rapidly and efficiently.

This object is solved by a method according to claim 1.

The present invention provides a method of converting a dimensional representation of a technical drawing in a CAD system from a first dimensional representation standard with first dimensional representation attributes into a second dimensional representation standard with second dimensional representation attributes, comprising the following steps:

1. selecting from the technical drawing dimensional representation elements to be converted;
2. reading said dimensional representation elements into a list; and
3. starting with the first dimensional representation element in said list:
   - 3.1. reading a dimensional representation element from said list;
   - 3.2. determining whether said dimensional representation element is provided with dimensional representation element legends which are independent of dimensional representation standards;
     - 3.2.1. if this is the case, storing all dimensional representation element legends;

3.3. converting the first dimensional representation attributes of said dimensional representation element into the second dimensional representation attributes;

3.4. determining whether said dimensional representation element is provided with dimensional representation element legends which are independent of dimensional representation standards;

3.4.1. if this is the case, restoring the dimensional representation element legends;

3.4.2. inserting the dimensional representation element legends into the dimensional representation element having the second dimensional representation attributes;

3.4.3. determining whether the dimensional representation element is provided with tolerance data;

3.4.3.1. if this is the case, converting said tolerance data into tolerance data having the second dimensional representation attributes.

It is the object of the present invention to provide a CAD system which permits a simple and efficient conversion of a dimensional representation of a technical drawing.

This object is solved by a CAD system according to claim 6.

The present invention provides a CAD system with a dimensional representation of a technical drawing which is adapted to be converted from a first dimensional representation standard with first dimensional representation attributes into a second dimensional representation standard with second dimensional representation attributes, said system comprising selection means used for selecting from said technical drawing dimensional representation elements to be converted;

a list into which the dimensional representation elements can be read; and a conversion control means, which, starting with the first dimensional representation element in said list, reads from said list a dimensional representation element;

determines whether said dimensional representation element is provided with dimensional representation element legends which are independent of dimensional representation standards;

if this is the case, stores all dimensional representation element legends;

converts the first dimensional representation attributes of said dimensional representation element into the second dimensional representation attributes;

determines whether said dimensional representation element is provided with dimensional representation element legends which are independent of dimensional representation standards;

if this is the case, restores the dimensional representation element legends;

inserts the dimensional representation element legends into the dimensional representation element having the second dimensional representation attributes;

determines whether the dimensional representation element is provided with tolerance data;

if this is the case, converts said tolerance data into tolerance data having the second dimensional representation attributes.

Preferred further developments of the present invention are defined in the subclaims.

BRIEF DESCRIPTION OF THE DRAWINGS

In the following, a preferred embodiment of the present invention will be described in detail on the basis of the drawings enclosed, in which.

DESCRIPTION OF PREFERRED
EMBODIMENTS OF THE INVENTION

Figure 1:
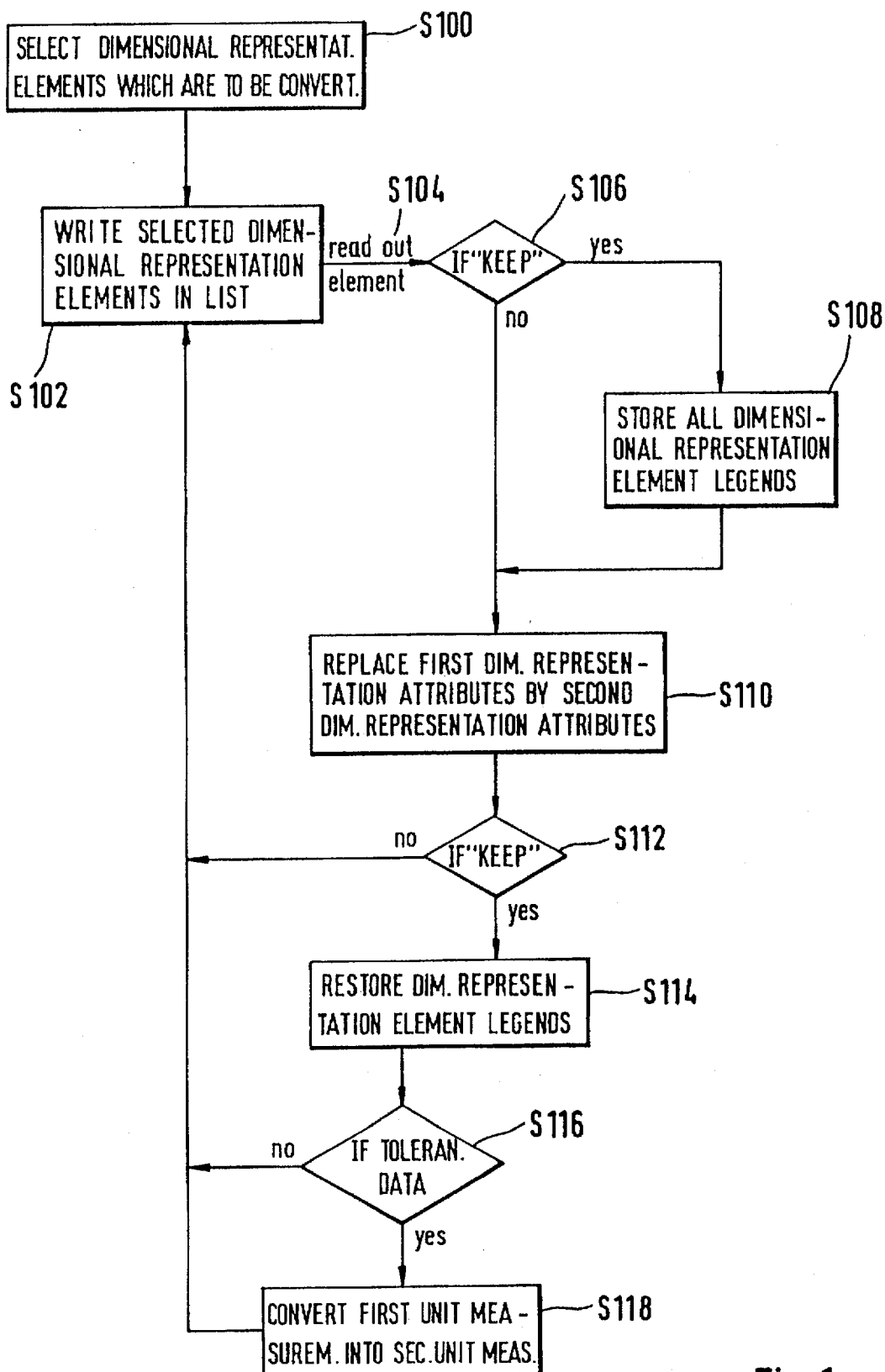
FIG. 1 shows a flowchart in which the method according to the present invention is shown.

In the following, the method according to the present invention will be described in detail on the basis of FIG. 1.

In a first step S100, dimensional representation elements of a technical drawing are selected, which are to be converted from a first dimensional representation standard with first dimensional representation attributes into a second dimensional representation standard with second dimensional representation attributes.

In step S102, the selected dimensional representation elements are then read into a list.

In step S104, a dimensional representation element is read out of the list.

In step S106, it is determined whether the command "keep" has been selected. The command "keep" determines whether dimensional representation element legends, which are independent of the dimensional representation standards, are to be maintained. Such dimensional representation element legends include e.g. so-called pre-, post-, super-and sub-fixes.

If it has been determined in step S106 that the command "keep" has been selected, all dimensional representation element legends will be stored in step S108 and the method will continue with step S110.

If it has been determined in step S106 that the command "keep" has not been selected, the method will directly continue with step S110.

In step S110, the first dimensional representation attributes of the dimensional representation element are converted into the second dimensional representation attributes. Subsequently, it is again determined in step S112 whether the command "keep" has been selected. If this is not the case, the method will return to step S104, and the next dimensional representation element in the list will be read out.

If it has been determined in step S112 that the command "keep" has been selected, the dimensional representation element legends will be restored in step S114.

In the following step S116, it is determined whether the dimensional representation element has associated therewith tolerance data. If this is not the case, the method will return to step S104.

If it has been determined in step S116 that the dimensional representation element has associated therewith tolerance data, the tolerance data will be converted in step S118 into tolerance data having the second dimensional representation attributes. This means, by way of example, that the tolerance data are converted from a first unit of measurement, which is determined by the first dimensional representation standard, into a second unit of measurement, which is determined by the second dimensional representation standard.

Subsequently, the method will return to step S104.

Reference is made to the fact that step S114 includes in addition to the measure of restoring the dimensional representation element legends also the measure of inserting the dimensional representation element legends into the dimensional representation element having the second dimensional representation attributes.

In the following, an example of a conversion of a dimensional representation of a technical drawing will be explained in detail on the basis of FIG. 2 and 3.

Figure 2:
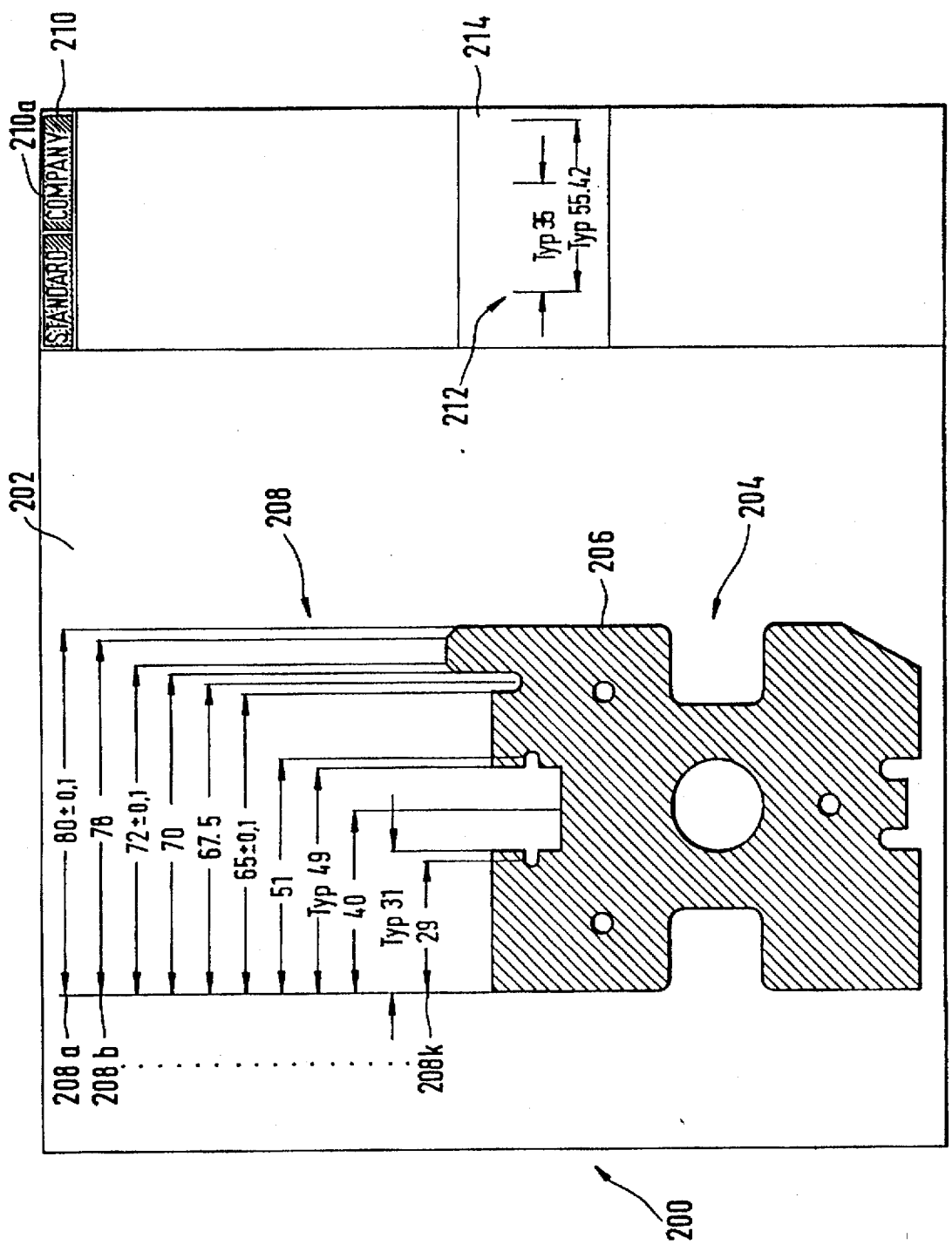
FIG. 2 shows a representation of a technical drawing prior to the conversion of the dimensional representation.

FIG. 2 shows a part 200 of a CAD system. In a main window 202, a technical drawing 204 is shown, which represents a component 206 and the dimensional representation 208 associated therewith.

The dimensional representation 208 comprises a plurality of dimensional representation elements 208a ... 208k.

The CAD system according to the present invention additionally comprises a selection bar 210 by means of which different dimensional representation standards can be selected. In the example in FIG. 2, a company-internal standard is selected in the selection bar 210. The name of the standard selected is displayed in a section 210a of the selection bar 210.

A dimensional representation 212 according to the selected dimensional representation standard is displayed in a preview window 214.

The selected dimensional representation standard determines the individual dimensional representation elements 208a ... 208k. The present standard, for example, provides that a legend of a dimensional representation element is arranged centrally between two dimensioning lines. The dimensioning letters are arranged between two dimensioning arrows.

The nature of the arrows used for dimensioning, the linewidth and the style of the dimensioning letters are determined by the dimensional representation attributes of the dimensional representation standard selected.

Figure 3:
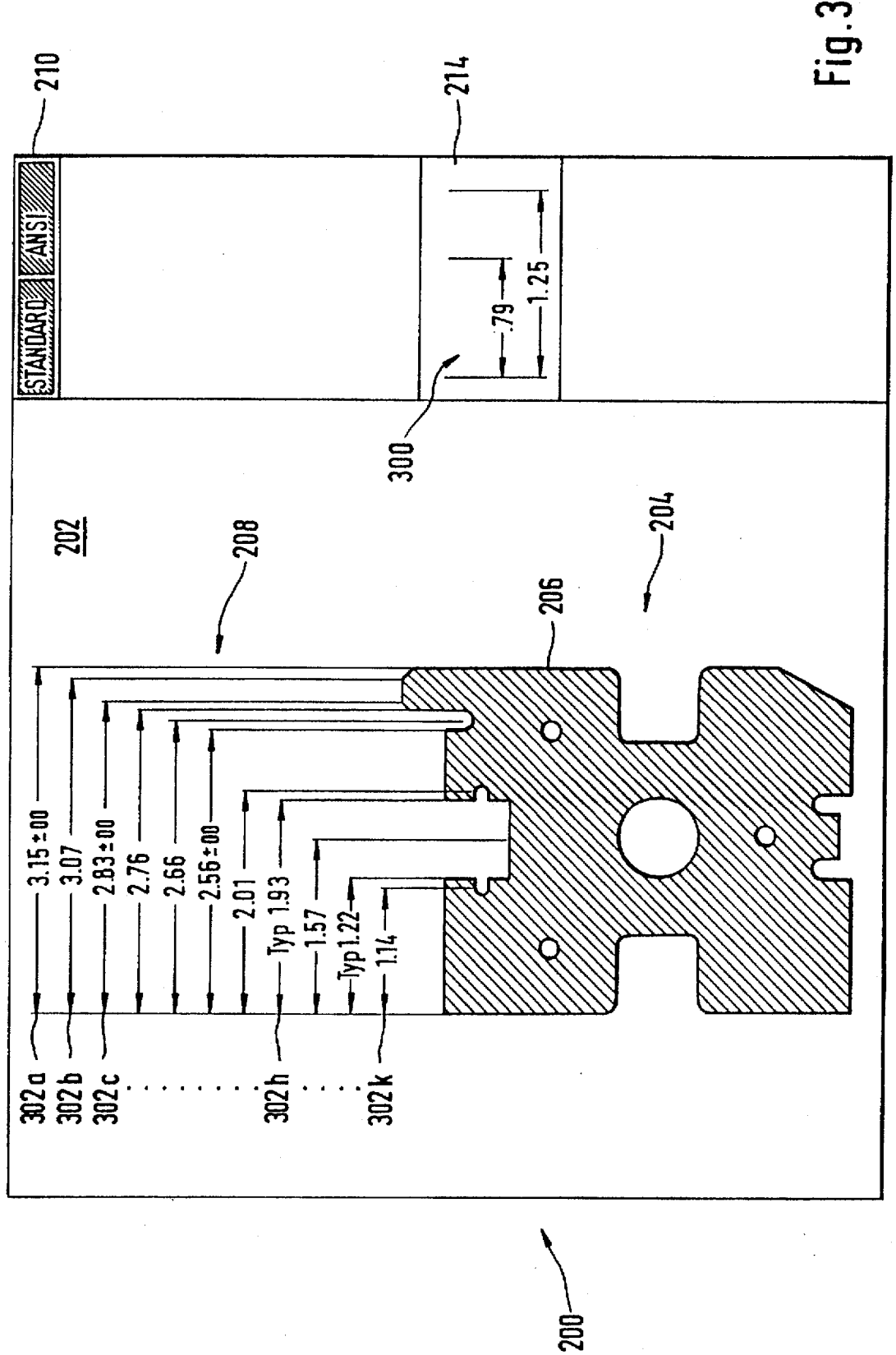
FIG. 3 shows a representation of the technical drawing of FIG. 2 subsequent to the conversion of the dimensional representation into a second dimensional representation standard.
Figure 4:
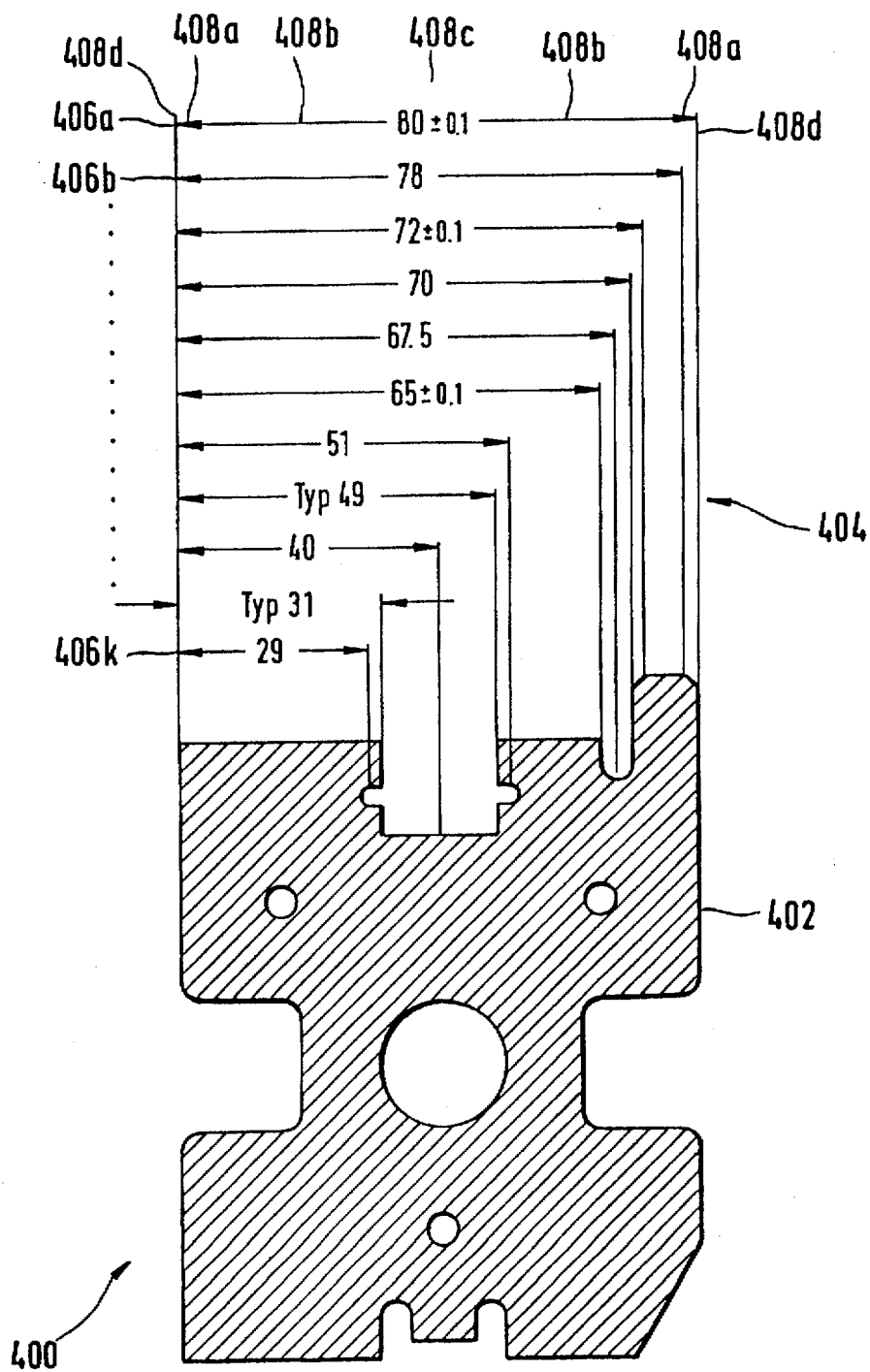
FIG. 4 shows quite generally a technical drawing with a dimensional representation.

In FIG. 3, the technical drawing 204 is shown, in which the conversion of the dimensional representation 208 into a second dimensional representation standard has already taken place.

In the example shown in FIG. 3, the ANSI standard has been selected making use of the selection bar 210. The dimensional representation 300 of this standard is displayed in window 214.

As has already been described hereinbefore, specific dimensional representation elements are selected for converting the dimensional representation 208. In the embodiment shown in FIG. 3, all the dimensional representation elements of the dimensional representation 208 have been converted.

The individual dimensional representation elements 302a ... 302k have been converted in accordance with the dimensional representation attributes of the newly selected dimensional representation standard 300. In the present example, the dimensioning letters have been converted into the style defined by the ANSI standard, and the units have been converted from the metric system into inches. Just as the representation of the dimensioning letters, also the representation of the tolerance data as well as the unit of the tolerance data have been converted into the ANSI standard.

The nature of the lines used as well as of the arrows used has been converted as well.

The dimensional representation of FIG. 2 included, in addition to the above-described elements, also elements in connection with which dimensional representation legends have been used which are independent of the ANSI standard. Also these dimensional representation elements have been converted and the ANSI standard-independent dimensional representation legends have been inserted into the dimensional representation elements making use of the fonts defined for the ANSI standard. One example of the above is the dimensional representation element 302h.

The method according to the present invention and the CAD system according to the present invention permit a selection of individual elements or of all elements of a dimensional representation of a technical drawing and the conversion of the elements from a first dimensional representation standard into a second dimensional representation standard. The complicated conversion of the individual attributes of a dimensional representation element is avoided by the method according to the present invention.

We claim:

1. A method of converting a dimensional representation of a technical drawing in a CAD system from a first dimensional representation standard with first dimensional representation attributes into a second dimensional representation standard with second dimensional representation attributes, comprising the following steps:
   1. selecting from the technical drawing, dimensional representation elements to be converted;
   2. reading said dimensional representation elements into a list;
   3. starting with the first dimensional representation element in said list:
      3.1. reading a dimensional representation element from said list;
      3.2. determining whether said dimensional representation element is provided with dimensional representation element legends which are independent of dimensional representation standards;
         3.2.1. if this is the case, storing all dimensional representation element legends;
      3.3. converting the first dimensional representation attributes of said dimensional representation element into the second dimensional representation attributes;
      3.4. determining whether said dimensional representation element is provided with dimensional representation element legends which are independent of dimensional representation standards;
         3.4.1. if this is the case, restoring the dimensional representation element legends;
         3.4.2. inserting the dimensional representation element legends into the dimensional representation element having the second dimensional representation attributes;
         3.4.3. determining whether the dimensional representation element is provided with tolerance data;
            3.4.3.1. if this is the case, converting said tolerance data into tolerance data having the second dimensional representation attributes.

2. A method according to claim 1, comprising the following steps carried out prior to step 1:
   displaying the technical drawing in the first dimensional representation standard in a main window; and
   displaying the dimensional representation in the second dimensional representation standard in a preview window.

3. A method according to claim 1, wherein the dimensional representation standards comprise the ANSI, ISO, DIN, JIS as well as a user-defined standard.

4. A method according to claim 1, wherein the dimensional representation attributes comprise a type of arrows, a line width, an arrangement of text, a style of letters, a style of tolerance and units of measurement.

5. A method according to claims 1, wherein dimensional representation element legends comprise pre-, post-, super- and sub-fixes.

6. A CAD system with a dimensional representation of a technical drawing which is adapted to be converted from a first dimensional representation standard with first dimensional representation attributes into a second dimensional representation standard with second dimensional representation attributes, said system comprising selection means used for selecting from said technical drawing dimensional representation elements to be converted;

a list into which the dimensional representation elements can be read; and a conversion control means, which, starting with the first dimensional representation element in said list, reads from said list a dimensional representation element;

determines whether said dimensional representation element is provided with dimensional representation element legends which are independent of dimensional representation standards;

if this is the case, stores all dimensional representation element legends;

converts the first dimensional representation attributes of said dimensional representation element into the second dimensional representation attributes; and determines whether said dimensional representation element is provided with dimensional representation element legends which are independent of dimensional representation standards;

if this is the case, restores the dimensional representation element legends;

inserts the dimensional representation element legends into the dimensional representation element having the second dimensional representation attributes;

determines whether the dimensional representation element is provided with tolerance data;

if this is the case, converts said tolerance data into tolerance data having the second dimensional representation attributes.

7. A CAD system according to claim 6, comprising a main window, which displays the technical drawing, and a preview window which displays the dimensional representation in the second dimensional representation standard.

\* \* \* \* \*